(12) United States Patent
Varrin, Jr. et al.

(10) Patent No.: US 7,857,911 B2
(45) Date of Patent: Dec. 28, 2010

(54) SCALE CONDITIONING AGENTS AND TREATMENT METHOD

(75) Inventors: Robert D. Varrin, Jr., Reston, VA (US); Sotaro Kaneda, Hokkidado (JP); Naonobu Sasada, Hokkidado (JP)

(73) Assignee: ASML Netherlands B.V., Veldhoven (NL)

( * ) Notice: Subject to any disclaimer, the term of this patent is extended or adjusted under 35 U.S.C. 154(b) by 1486 days.

(21) Appl. No.: 11/095,671

(22) Filed: Apr. 1, 2005

(65) Prior Publication Data

US 2005/0247269 A1   Nov. 10, 2005

Related U.S. Application Data

(60) Provisional application No. 60/558,143, filed on Apr. 1, 2004.

(51) Int. Cl.
*B08B 9/04* (2006.01)

(52) U.S. Cl. ............... 134/22.19; 134/26; 134/29; 134/30; 134/34; 134/2

(58) Field of Classification Search ............ 134/1, 134/2, 3, 8, 22.19, 26, 29, 30, 34
See application file for complete search history.

(56) References Cited

U.S. PATENT DOCUMENTS

| | | | |
|---|---|---|---|
| 3,996,062 A | 12/1976 | Frost et al. | |
| 4,045,253 A | 8/1977 | Banks et al. | |
| 4,578,162 A | 3/1986 | McIntyre et al. | |
| 4,586,961 A | 5/1986 | Bradley et al. | |
| 4,632,705 A | 12/1986 | Baum | |
| 4,666,528 A * | 5/1987 | Arrington et al. ........... 134/2 |
| 4,720,306 A | 1/1988 | Emmert et al. | |
| 4,899,697 A | 2/1990 | Franklin et al. | |
| 4,921,662 A | 5/1990 | Franklin et al. | |
| 4,972,805 A | 11/1990 | Weems | |
| 5,006,304 A | 4/1991 | Franklin et al. | |
| 5,019,329 A | 5/1991 | Franklin et al. | |
| 5,092,280 A | 3/1992 | Franklin et al. | |
| 5,092,355 A | 3/1992 | Chadwell et al. | |
| 5,575,863 A | 11/1996 | Sala et al. | |
| 5,601,657 A * | 2/1997 | Baum ........................... 134/3 |
| 5,764,717 A | 6/1998 | Rootham | |
| 5,779,814 A | 7/1998 | Fellers, Sr. et al. | |
| 5,814,204 A | 9/1998 | D'Muhala | |
| 5,841,826 A | 11/1998 | Rootham et al. | |
| 6,017,399 A | 1/2000 | Fellers, Sr. et al. | |
| 6,740,168 B2 | 5/2004 | Rootham et al. | |
| 2002/0196891 A1 * | 12/2002 | Rootham et al. ........... 376/305 |

OTHER PUBLICATIONS

W. Frenier and F. Growcock, "Mechanism of Iron Oxide Dissolution—A Review of Recent Literature", Corrosion, vol. 40 (No. 12), pp. 663-668, (Dec. 1984).

* cited by examiner

*Primary Examiner*—Michael Kornakov
*Assistant Examiner*—Stephen Ko
(74) *Attorney, Agent, or Firm*—Pillsbury Winthrop Shaw Pittman LLP

(57) ABSTRACT

An improved scale conditioning composition and method is disclosed that results in improved dissolution and disruption of tube scale, hardened sludge and other deposits composed primarily of highly densified magnetite such as those found in heat exchange vessels, particularly steam generators. After treatment with the advanced scale conditioning composition, these magnetite rich deposits are more easily removed using known and commercially available high pressure hydro-mechanical cleaning techniques. The present invention further provides effective cleaning in a short period of time and at relatively low temperatures, while reducing the amount of waste produced and reducing the resulting corrosion of carbon and low alloy steel components within the steam generator during the cleaning process.

38 Claims, No Drawings

SCALE CONDITIONING AGENTS AND TREATMENT METHOD

CROSS REFERENCE TO RELATED APPLICATIONS

The application relates to and claims priority to U.S. Provisional Patent Application No. 60/558,143, filed on Apr. 1, 2004 and entitled "Improved Scale Conditioning Agents and Treatment Method." The contents of which are hereby incorporated in its entirety.

BACKGROUND OF THE INVENTION

1. Field of the Invention

The invention relates to an advanced formulation scale conditioning process and composition for enhancing the removal or structural modification of films, scales, and sludge deposits from industrial process vessels and piping, such as shell and tube heat exchangers, boilers, and steam generators. In particular, the present invention relates to an advanced formulation scale conditioning process and composition for either enhancing the removal of films, scales, sludge deposits and the like, or modifying their structure, that can be performed at a wide range of pH levels and increased concentration levels. The composition has been shown to increase the porosity of the deposits to aid in their removal or enhance heat transfer through the deposits during heat exchanger operation. The composition does not adversely effect the structural integrity of the heat exchanger. As such, the duration of the cleaning process can be increased which further promotes increase in the porosity of the films, scales and sludge deposits.

2. Related Art

Metal surfaces exposed to water or aqueous solutions over long periods of time in closed heat transfer systems develop scales and/or become covered by sludge and other deposits. This occurs regardless of the system water purity levels. For example, in commercial electric power generating plants, after on-line operation at temperatures of 200° C. or more, large shell and tube heat exchangers, such as those known as nuclear steam generators, develop adherent scales and/or sludge deposits on the secondary side surfaces of tubes, tube sheets, tube support plates, and other internal structural parts. These troublesome scales and deposits form even in those instances in which the purity of the water may be controlled to levels at or below parts per million or parts per billion. Over a period of time, the accumulation of these scales and sludge will have an adverse effect on the operational performance of the steam generators.

Various off-line cleaning methods have been developed to remove the scales and sludge built up on the internal surfaces of heat exchangers used to generate steam. Commercially successful methods include: pressure pulsing with shock waves; water slapping; chemical cleaning at elevated temperatures, using a variety of chelants at concentrations ranging between approximately 5 and 25%; use of scale conditioning agents at elevated pH (around 10.5); and flushing with high pressure water. Both pressure pulse and chemical methods for cleaning the interior of heat exchanger vessels such as the secondary sides of nuclear steam generators are known in the prior art. U.S. Pat. No. 4,899,697 to Franklin et al., U.S. Pat. No. 4,921,662 to Franklin et al., U.S. Pat. No. 5,006,304 to Franklin et al., U.S. Pat. No. 5,092,280 to Franklin, et al., and U.S. Pat. No. 5,092,355 to Cadwell et al. all disclose pressure pulse cleaning methods and devices to loosen and remove sludge and debris from heat exchanger surfaces within the secondary side of nuclear steam generators by means of shock waves introduced in water. U.S. Pat. No. 5,019,329 to Franklin et al. discloses an improved cleaning method for the secondary side of nuclear steam generators by means of vertically flushing the secondary side of nuclear steam generators during pressure pulse or other shock wave type cleaning operations.

In prior art chemical cleaning processes, it was typically necessary to introduce and remove chemical cleaning agents and rinsing solutions a number of times before the sludge and deposits have been effectively removed. In such prior art processes, it was also typically necessary to heat the system during the cleaning process to achieve satisfactory results. Also, in the prior art many of the cleaning agents employed were corrosive and both promoted new and unwanted corrosion of carbon and low alloy steels and/or required an additional neutralization or rinsing step. In some prior art methods, using corrosion inhibitors could decrease this corrosion. However, the inclusion of corrosion inhibitors imposes additional limits, or constraints, on the application temperature of the cleaning process, since these corrosion inhibitors have diminished effectiveness and/or can undergo thermal decomposition as the temperature of the cleaning operation exceeds 120° C.

U.S. Pat. No. 5,764,717 to Rootham and U.S. Pat. No. 5,841,826 to Rootham et al. disclose chemical cleaning methods for removing scale sludge and other deposits from nuclear steam generators. Pressure pulses are generated in a non-corrosive basic amine-containing chemical cleaning agent in aqueous solution after a cleaning agent is introduced into the interior of the generator. The chemical cleaning agents are passive towards ferritic materials. In particular, these scale conditioning agent formulations were designed to minimize interaction with magnetite, the principal component of most scale and hardened sludge deposits. It is believed that minimizing interaction with these materials would eliminate any corrosive effects in the interior of the secondary side of the generator.

U.S. Pat. No. 5,779,814 to Fellers et al. and U.S. Pat. No. 6,017,399 to Fellers et al. disclose a method for controlling and removing solid deposits from components in a steam generating system. The method includes adding a volatile amine to an aqueous phase in the steam generating system. The aqueous phase containing the volatile amine is then converted to steam and brought into contact with the compound in the system containing the solid deposits.

SUMMARY OF THE INVENTION

Unlike the prior art, it has been found that interaction with the magnetite enhances the chemical cleaning process. The advanced formulation scale conditioning agents of the present invention has the ability both to interact with magnetite causing controlled dissolution and to assist in removing copper and silicate enriched hydrothermal minerals, and both actions may increase porosity of the scale sludge. Highly densified magnetite generally resists penetration by prior art scale conditioning agents comprising combinations of strongly basic amines and intercalation agents. The improved scale conditioning agents of the present invention, however, by overcoming these limitations, are especially useful in removing scales and other deposits which are composed principally of homogenous and highly densified magnetite.

It is an aspect of the embodiments present invention to provide an effective method for the partial dissolution, softening, and disruption of tube scale, hardened sludge and other deposits composed primarily of highly densified magnetite that are present within heat exchange vessels, in particular the interior of the secondary side of a nuclear steam generator. After treatment with the advanced scale conditioning agent these deposits are more easily removed using commercially available high pressure hydro-mechanical cleaning techniques such as conventional sludge lancing, CECIL™, pressure pulse cleaning (PPC), and upper bundle hydraulic cleaning (UBHC).

The method according to embodiments of the present invention, is effective in cleaning at a wider range of pH levels, higher ethylenediamine tetraacetic acid (EDTA) concentrations and at low temperatures, generating a minimum amount of liquid radioactive waste, and minimizing corrosion of carbon and low alloy steel components within the steam generator during the cleaning process. The method in accordance with the present invention has shown that cleaning agents disclosed herein do not adversely impact the steel components of the generator. As a result, the reaction process when compared to the prior art processes can be slowed down which increases the porosity of the scale sludge for enhanced cleaning.

Generally speaking, the invention is an improved method for chemically removing and disrupting scale, sludge, corrosion products and other deposits from the interior of a heat exchanger vessel such as the interior of a nuclear steam generator that eliminates, or at least ameliorates shortcomings associated with the prior art. The method of the invention generally comprises introducing a dilute aqueous solution of additives into the interior of a heat exchanger vessel (for example, the secondary side of a nuclear steam generator). The solution introduced into the heat exchanger reacts with the deposits to partially dissolve the densified magnetite in a controlled manner and modify the structure of the remaining deposits such that they are more easily removed using known hydro-mechanical cleaning techniques or become weakened such that they are dislodged upon restart of the plant by normal hydraulic forces. The porosity of the deposit structure is increased which improves subsequent removal. The present invention achieves the partial dissolution of the magnetite and modification of the deposit structure without causing excessive corrosion of carbon and low alloy steel structural components within the steam generator and without using a corrosion inhibitor. Upon completion of the scale conditioning process (the dissolution, softening and disruption of the existing scale and deposits), the cleaning solution is drained from the steam generator. If application of the conditioning solution is performed in conjunction with the application of PPC, a post-conditioning rinse of at least de-ionized water, or a mixture of de-ionized water, hydrazine and optionally, ammonia or one or more amines is preferred to remove cleaning solution residuals. If, however, a hydro-mechanical cleaning process is to be applied to the steam generator after completion of the exposure to the dilute conditioning solution, no such post-conditioning rinse step is required.

In addition, the waste disposal concerns, including the potential generation of hazardous and/or mixed wastes associated with the prior art processes are eliminated in the new method.

In the method of the invention the dilute aqueous solution of a chemical cleaning agent is formed from a chelant or mixture of chelants which may be EDTA, hydroxyethyl ethylenediamine triacetic acid (HEDTA), or chelants such as lauryl substituted EDTA and/or polyaspartic acid plus imminodisuccinate, or the like. A reducing agent such as ascorbic acid or one of the isomeric forms of ascorbic acid, citric acid, hydrazine, catalyzed hydrazine, carbohydazide, or the like can be employed in the chemical cleaning agents. A pH adjusting compound containing most preferably 1 to 10 carbon atoms, such as a lower alkyl amine or an alkanolamine, ammonium hydroxide, or the like is also included. A low foaming non-ionic surfactant such as Triton X-100, or the like can be included.

The nitrogen containing alkyl amine or alkanolamine is at least one of the group comprising dimethylamine, ethylamine, 1,2-diaminoethane and diaminopropane, ethanolamine, diethanolamine, triethanolamine, 2-methyl-2-amono-1-propanol, 5-aminopentanol, and methoxypropylamine or similar compounds.

In accordance with the present method, the concentration of the cleaning agent within the aqueous solution can be maintained up to about 2 weight percent or higher. These concentrations are significantly higher than the prior art concentrations. The concentration is preferably up to 1 weight percent based on the total solution. It is contemplated that concentrations higher than 1 weight percent and higher than 2 weight percent are well within the scope of the present invention. Although these concentrations have been found to be generally sufficient to increase porosity, partially remove and disrupt the scale, sludge, and other deposits effectively, lower concentrations may be useful in particular applications. The preferred temperature of application for the cleaning process is less than 95° C., more preferably in the range of approximately 30-75° C., and most preferably approximately 30° C. The preferred pH range for application of the cleaning process is between pH 4 and pH 11. It has been found that the concentration is related to the pH level. Higher concentrations require higher pH levels. Lower concentrations require lower pH levels. For example, an EDTA concentration percent of approximately 1% or higher may require a pH level of 9.8 to 10.8 to produce the desired porosity. As those of ordinary skill in the art will appreciate, heat exchange systems are not identical and, as a result of variations in parameters such as water composition, operating temperature, and exchanger design, have somewhat unique cleaning requirements. In selecting an appropriate cleaning method, therefore, it is typical to customize both the chemical cleaning composition and the application parameters to some degree based on plant specific testing. Such common adjustments in the cleaning composition and the application parameters are, therefore, consistent with the scope of the present invention.

DETAILED DESCRIPTION OF THE PREFERRED EMBODIMENTS

The improved scale conditioning agents of the preferred embodiment of the invention are particularly useful in assisting deposit removal from the secondary side of a nuclear steam generator. In operation, hot radioactive water from the reactor core flows through the inside of the heat exchanger tubes, transferring much of its heat through the walls of the tubes and into the non-radioactive water surrounding these tubes. This causes the non-radioactive water to boil and create the steam that is used for electrical power generation. During the boiling process scale, sludge, and other deposits accumulate on the free span tube surfaces, in crevices between the tube support plates and the tube walls, in the lobes or flow holes within support plates, and on horizontal surfaces such as tube sheets and the upper surfaces of tube support plates. Chemical analysis has shown that the principal component of the sludge, tube scale, and other secondary side deposits is magnetite, together with trace amounts of copper, copper oxide, and siliceous minerals. The improved scale conditioning agents according to embodiments of the present invention increase the porosity of the sludge, scale and other deposits by promoting the dissolution of the magnetite. This is the result of encouraging the interaction between the magnetite and the cleaning solution. The scale conditioning agent in accordance with the present invention reacts with the magnetite to remove the same.

The cleaning solution is an aqueous solution of demineralized water containing a dilute cleaning agent that may include a chelant or mixture of chelants, and a pH control agent. The cleaning agent may include a reducing agent and/or a surfactant. The reducing agent can take one of several forms, such as ascorbic acid or one of the isomeric forms of ascorbic acid, citric acid, hydrazine, catalyzed hydrazine, carbohydrazide, or the like can be employed in the chemical cleaning agents. Hydrazine has been found to be a very effective reducing agent. It has been found that surfactant is not a necessary component to achieve the desired porosity in accordance with the present invention. The effectiveness of the cleaning method is determined by the ability to control the rate of the reaction between the chelant and magnetite. When the reaction between the chelant and the magnetite present in the deposit proceeds slowly the chelant not only reacts at the surface of the deposit, but also penetrates below the surface to increase porosity within the deposit and promote laminar dissolution of the magnetite. These reactions result in undercutting of the magnetite and the dissolution of minor components, such as copper and siliceous compounds, within the deposit matrix. The chelant, or mixture of chelants, may be selected from a group comprising EDTA, HEDTA, and chelants such as lauryl substituted EDTA and/or polyaspartic acid plus imminodisuccinate. The preferred chelants are EDTA and its saponified derivatives. The pH adjusting compounds include ammonium hydroxide or compounds that contain 1 to 10 carbon atoms, such as a lower alkyl amine or an alkanolamine. The preferred alkalizing agents are alkanolamines because prior testing has shown that alkanolamines extend the effective pH range for the chelation of iron by EDTA.

The preferred concentration of the chelating agent in the water component of the solution is up to 2 weight percent. The concentration may exceed 2 weight percent. Preferably, the preferred concentration is up to and approximately 1 weight percent. Concentrations lower that 1 weight percent are contemplated. Concentrations higher than 2 weight percenet. The inventors have found that with these concentrations, the rate of reaction between the chelant and magnetite is slow enough both to maximize the dissolution of minor components within the deposit and to minimize the corrosion of carbon and low alloy steel components within the steam generator. In addition, if local environmental discharge requirements preclude direct release of the spent cleaning solution to the environment, the spent cleaning solution can be absorbed readily onto ion exchange resin or resins for disposal as solid waste. The concentrations of the reducing agent, and pH control agent are determined by the selected chelant and its concentration. It has been found that the concentration level is related to the pH level for the cleaning process. For, higher concentrations of the chelating agent, higher pH levels are used. For example, an EDTA concentration percentage of approximately 1% may require a pH level up to 9.8 to 10.8

The preferred temperature of application for the cleaning process is less than 95° C., preferably in the range of approximately 30 to 75° C., and most preferably approximately 30° C. Although the rate of reaction between the chelant and magnetite is temperature dependent, the inventors have found that the reaction between the chelant and magnetite is generally well controlled in this temperature range. Higher pH levels can be used in connection with the scale conditioning agents of the present invention. The preferred pH range for application of the cleaning process is between pH 5.5 and pH 11. The inventors have found that the corrosion of carbon and low alloy steels is minimized, and the rate of reaction between the chelant and magnetite is well controlled within these pH ranges.

Under the preferred conditions, corrosion testing using non-passivated coupons has shown metal loss rates for typical steam generator secondary side carbon and low alloy steels to be in the range of 0.0002 to 0.0003 inch per application of the cleaning process. This low, and extremely conservative, rate of corrosion permits numerous applications of the cleaning process. Typically, the limiting per application corrosion rate for the chemical cleaning of nuclear steam generators is in the range of 0.002 to 0.003 inch, and the maximum number of cleaning applications that may be performed at the limiting corrosion rate is three.

According to the present method, the conditioning solution may be prepared by feeding the appropriate amounts of one or more premixed diluted or concentrated solutions or the individual components into the heat exchanger. followed by flow induced mixing and/or sparging with an inert gas to control the rate and extent of chelant uptake by the magnetite. This preferred process may be performed with or without in-process replenishment of the cleaning solution.

The invention having been disclosed in connection with the foregoing embodiment and examples, additional variations will now be apparent to persons skilled in the art. For example, it is contemplated that the concentration of the cleaning agent can be 2 weight percent or higher. The invention is not intended to be limited to the embodiment specifically mentioned and accordingly reference should be made to the appended claims rather than the foregoing discussion of preferred embodiments and examples to assess the spirit and scope of the invention in which exclusive rights are claimed.

We claim:

1. A method of conditioning and removing scale and deposits within a heat exchange system that utilizes at least one heat transfer liquid comprising:
   taking the heat exchange system out of service;
   removing at least a portion of the heat transfer liquid from the heat exchange system;
   introducing an aqueous cleaning solution of a scale conditioning agent into the heat exchange system, wherein the scale conditioning agent comprising a chelant, the chelant being present in the aqueous cleaning solution at a treatment concentration that is higher than 1 weight percent and less than or equal to about 2 weight percent;
   maintaining the aqueous cleaning solution at a treatment temperature;
   maintaining the aqueous cleaning solution at a treatment pH that is higher than 9.0 and less than or equal to 11.0;
   removing substantially all of the aqueous cleaning solution from the heat exchange system;
   introducing replacement heat transfer liquid; and
   returning the heat exchange system to service,
   wherein the heat exchange system comprises a steam generator of a nuclear power plant,
   wherein the method is performed without using a corrosion inhibitor.

2. The method according to claim 1, wherein the chelant comprises at least one chelant selected from a group consisting of EDTA, HEDTA, lauryl substituted EDTA, and polyaspartic acid with imminodisuccinate; and
   the scale conditioning agent further comprises a pH control agent; and the pH control agent is a nitrogen containing aliphatic compound having fewer than 10 carbons such as triethanolamine, dimethylamine, ethylamine, 1,2-diaminoethane, diaminopropane, ethanolamine, diethanolamine, 2-methyl-2-amono-1-propanol, 5-aminopentanol, or methoxypropylamine.

3. The method according to claim 1, wherein the treatment temperature is less than 100° C.

4. The method according to claim 3, wherein the treatment temperature is less than 75° C.

5. The method according to claim 1, wherein the treatment pH is between pH 9.8 and pH 10.8.

6. The method according to claim 1, further comprising agitating the aqueous cleaning solution as it circulates through the heat exchange system by flow induced mixing, inert gas sparging, or a combination of the two methods.

7. The method according to claim 1, further comprising introducing additional scale conditioning agent before removing substantially all of the aqueous cleaning solution from the heat exchange system.

8. The method according to claim 7, wherein the additional scale conditioning agent is introduced into the heat exchange system as a concentrated premix solution, the introduction of the additional scale conditioning agent being sufficient to maintain the scale conditioning agent at the treatment concentration.

9. The method according to claim 1, further comprising:
introducing an aqueous rinse solution into the heat exchange system;
performing at least one hydro-mechanical cleaning operation; and
removing substantially all of the aqueous rinse solution;
wherein these additional steps are completed before introducing replacement heat exchange liquid.

10. The method according to claim 1, wherein the scale conditioning agent further comprising a reducing agent, wherein the reducing agent is selected from the group comprising: ascorbic acid, citric acid, hydrazine, catalyzed hydrazine, carbohydrazide, and isomeric forms of ascorbic acid, citric acid, hydrazine, catalyzed hydrazine, and carbohydrazide.

11. The method according to claim 1, wherein the treatment pH is between 9 and 11.

12. The method of claim 1, wherein:
the method comprises conditioning and removing scale and deposits from free span tube surfaces within the heat exchange system;
the heat exchange system is configured and arranged to transfer heat to the heat transfer liquid via the free span tube surfaces;
the scale conditioning agent comprises a reducing agent; and
the free span tube surfaces have scale and deposits accumulated thereon when the aqueous cleaning solution is introduced into the heat exchange system.

13. The method of claim 1, wherein the method further comprises, between taking the heat exchange system out of service and returning the heat exchange system to service, increasing the porosity of magnetite scale disposed on surfaces of tubes of the steam generator.

14. A method of conditioning and removing scale and deposits within a heat exchange system that utilizes at least one heat transfer liquid comprising:
taking the heat exchange system out of service;
providing within the heat exchange system an aqueous cleaning solution of a scale conditioning agent, the scale conditioning agent comprising a chelating agent, the chelating agent being present in the aqueous cleaning solution at a treatment concentration range higher than 1 weight percent and less than or equal to 2 weight percent,
circulating the aqueous cleaning solution throughout the heat exchange system during a treatment period and, while circulating the aqueous cleaning solution;
maintaining the temperature of the aqueous cleaning solution within a treatment temperature range;
maintaining the pH of the aqueous cleaning solution within a treatment pH range that is higher than 9.0 and less than or equal to 11.0; and
agitating the aqueous cleaning solution as it circulates through the heat exchange system during a least a portion of the treatment period;
removing substantially all of the aqueous cleaning solution from the heat exchange system at the end of the treatment period;
introducing replacement heat transfer liquid; and
returning the heat exchange system to service,
wherein the heat exchange system comprises a steam generator of a nuclear power plant,
wherein the combination of the treatment temperature, the treatment pH, and the treatment period are sufficient both to increase the porosity and dissolution of magnetite scale,
wherein this combination of the treatment temperature, the treatment pH, and the treatment period induce corrosion of less than 0.001 inch per application in carbon and low alloy steels, and
wherein the method is performed without using a corrosion inhibitor.

15. The method according to claim 14, wherein forming the aqueous cleaning solution further comprises:
introducing a predetermined amount of an aqueous premix solution into the heat exchange system,
the aqueous premix solution comprising a concentrated solution of the scale conditioning agent,
wherein the predetermined amount of the aqueous premix solution being sufficient, when combined with the heat exchange liquid, to form an aqueous cleaning solution such that the concentration of scale conditioning agent is within the treatment concentration range.

16. The method according to claim 14, wherein the treatment temperature is less than 100° C.

17. The method according to claim 16, wherein the treatment temperature is less than 75° C.

18. The method according to claim 14, wherein the treatment pH is between pH 9.8 and pH 10.8.

19. The method according to claim 14, wherein the scale conditioning agent further comprising a reducing agent, wherein the reducing agent is selected from the group comprising: ascorbic acid, citric acid, hydrazine, catalyzed hydrazine, carbohydrazide, and isomeric forms of ascorbic acid, citric acid, hydrazine, catalyzed hydrazine, and carbohydrazide.

20. The method according to claim 14, wherein the treatment pH is between 9 and 11.

21. The method of claim 14, wherein:
the method comprises conditioning and removing scale and deposits from free span tube surfaces within the heat exchange system;
the heat exchange system is configured and arranged to transfer heat to the heat transfer liquid via the free span tube surfaces;
the scale conditioning agent comprises a reducing agent; and the free span tube surfaces have scale and deposits accumulated thereon when the aqueous cleaning solution is provided within the heat exchange system.

22. A method of conditioning and removing scale and deposits within a heat exchange system that utilizes at least one heat transfer liquid comprising, in sequence, the steps of:
taking the heat exchange system out of service;
providing an aqueous cleaning solution of a scale conditioning agent within the heat exchange system, the scale conditioning agent comprising a chelant, a treatment concentration of the chelant in the aqueous cleaning solution in the heat exchange system being higher than 1 weight percent and less than or equal to about 2 weight percent, the aqueous cleaning solution having a pH higher than 9.0 and less than or equal to 11.0;
removing substantially all of the aqueous cleaning solution from the heat exchange system;
returning the heat exchange system to service,
wherein the heat exchange system comprises a steam generator of a nuclear power plant,
wherein the method further comprises, between taking the heat exchange system out of service and returning the heat exchange system to service, inducing corrosion of less than 0.001 inch in carbon and low alloy steels, and
wherein the method is performed without using a corrosion inhibitor.

23. The method of claim 22, further comprising:
before providing the aqueous cleaning solution of the scale conditioning agent within the heat exchange system, removing at least a portion of the heat transfer liquid from the heat exchange system; and
after removing substantially all of the aqueous cleaning solution from the heat exchange system, introducing replacement heat transfer liquid.

24. The method of claim 22, wherein the scale conditioning agent further comprises a reducing agent.

25. The method of claim 24, wherein the scale conditioning agent further comprises a pH control agent.

26. The method of claim 25, wherein the scale conditioning agent further comprises a non-ionic surfactant.

27. The method of claim 22, further comprising, prior to removing substantially all of the aqueous cleaning solution from the heat exchange system:
circulating the aqueous cleaning solution throughout the heat exchange system and, while circulating the aqueous cleaning solution,
maintaining the aqueous cleaning solution at a treatment temperature; and
agitating the aqueous cleaning solution as it circulates through the heat exchange system.

28. The method of claim 27, further comprising, while circulating the aqueous cleaning solution, maintaining the aqueous cleaning solution at a pH of between 9.8 and 10.8.

29. The method of claim 22, wherein the aqueous cleaning solution has a pH that is between 9.8 and 10.8.

30. The method of claim 22, wherein said providing within the heat exchange system the aqueous cleaning solution comprises introducing the aqueous cleaning solution into the heat exchange system.

31. The method of claim 22, wherein said providing within the heat exchange system the aqueous cleaning solution comprises forming the aqueous cleaning solution in the heat exchange system.

32. The method of claim 22, wherein the aqueous cleaning solution has a pH that is between 9 and 11.

33. The method of claim 22, wherein:
the method comprises conditioning and removing scale and deposits from free span tube surfaces within the heat exchange system;
the heat exchange system is configured and arranged to transfer heat to the heat transfer liquid via the free span tube surfaces;
the scale conditioning agent comprises a reducing agent; and
the free span tube surfaces have scale and deposits accumulated thereon when the aqueous cleaning solution is provided within the heat exchange system.

34. The method of claim 22, wherein the method further comprises, between taking the heat exchange system out of service and returning the heat exchange system to service, increasing the porosity of magnetite scale disposed on surfaces of tubes of the steam generator.

35. A method of conditioning and removing scale and deposits within a heat exchange system that utilizes at least one heat transfer liquid comprising, in sequence, the steps of:
taking the heat exchange system out of service;
providing within the heat exchange system an aqueous cleaning solution of a scale conditioning agent, the scale conditioning agent comprising a chelant at a concentration in the aqueous cleaning solution that is higher than 0.034 moles per liter and less than or equal to 0.068 moles per liter, the aqueous cleaning solution having a pH that is higher than 9.0 and less than or equal to 11.0;
removing substantially all of the aqueous cleaning solution from the heat exchange system;
returning the heat exchange system to service,
wherein the heat exchange system comprises a steam generator of a nuclear power plant,
wherein the chelant is present in the aqueous cleaning solution at a concentration that is less than or equal to 2 weight percent,
wherein the chelant is present in the aqueous cleaning solution at a treatment concentration higher than 1 weight percent,
wherein the method further comprises, between taking the heat exchange system out of service and returning the heat exchange system to service, inducing corrosion of less than 0.001 inch in carbon and low alloy steels, and
wherein the method is performed without using a corrosion inhibitor.

36. The method of claim 35, wherein the pH is between pH 9.8 and pH 10.8.

37. The method of claim 35, wherein:
the method comprises conditioning and removing scale and deposits from free span tube surfaces within the heat exchange system;
the heat exchange system is configured and arranged to transfer heat to the heat transfer liquid via the free span tube surfaces;
the scale conditioning agent comprises a reducing agent; and
the free span tube surfaces have scale and deposits accumulated thereon when the aqueous cleaning solution is provided within the heat exchange system.

38. The method of claim 35, wherein the method further comprises, between taking the heat exchange system out of service and returning the heat exchange system to service, increasing the porosity of magnetite scale disposed on surfaces of tubes of the steam generator.

* * * * *

UNITED STATES PATENT AND TRADEMARK OFFICE
CERTIFICATE OF CORRECTION

| | | |
|---|---|---|
| PATENT NO. | : 7,857,911 B2 | Page 1 of 1 |
| APPLICATION NO. | : 11/095671 | |
| DATED | : December 28, 2010 | |
| INVENTOR(S) | : Robert D. Varrin, Jr. et al. | |

It is certified that error appears in the above-identified patent and that said Letters Patent is hereby corrected as shown below:

On title page, item (73) Assignee
        replace "ASML Netherlands B.V., Veldhoven (NL)"
        with --Dominion Engineering, Inc., Reston, VA--.

Signed and Sealed this
Fifth Day of July, 2011

David J. Kappos
*Director of the United States Patent and Trademark Office*